United States Patent
Yang et al.

(10) Patent No.: US 7,020,260 B2
(45) Date of Patent: Mar. 28, 2006

(54) ENHANCED FLEXIBLE ALERTING

(75) Inventors: ZhongJin Yang, Naperville, IL (US); Jie Yao, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 322 days.

(21) Appl. No.: 10/369,159

(22) Filed: Feb. 19, 2003

(65) Prior Publication Data
US 2004/0161088 A1 Aug. 19, 2004

(51) Int. Cl.
H04M 3/42 (2006.01)
H04M 11/04 (2006.01)

(52) U.S. Cl. .................. 379/211.04; 379/49

(58) Field of Classification Search ............. 379/211.01–211.04, 207.16, 207.02, 212.01, 379/265.02, 45, 49, 266.04
See application file for complete search history.

(56) References Cited

U.S. PATENT DOCUMENTS

| | | | | |
|---|---|---|---|---|
| 5,323,444 A | * | 6/1994 | Ertz et al. ................. | 379/45 |
| 5,524,147 A | * | 6/1996 | Bean ..................... | 379/266.03 |
| 5,802,160 A | * | 9/1998 | Kugell et al. ............ | 379/211.04 |

* cited by examiner

Primary Examiner—Benny Q. Tieu

(57) ABSTRACT

A method and apparatus for alerting a plurality of groups of telephone stations in sequence in response to receipt of a pilot directory number in a first telephone switching system first switch alerting a group of telephones; if none of the first group of telephones answers establishing a connection via a second pilot directory number to a second switch for accessing a second group of telephones and alerting the members of the second group. Advantageously, this arrangement allows a telephone call to be completed to a first preferred group of telephones before attempting to complete the call to a second group of telephones.

12 Claims, 2 Drawing Sheets

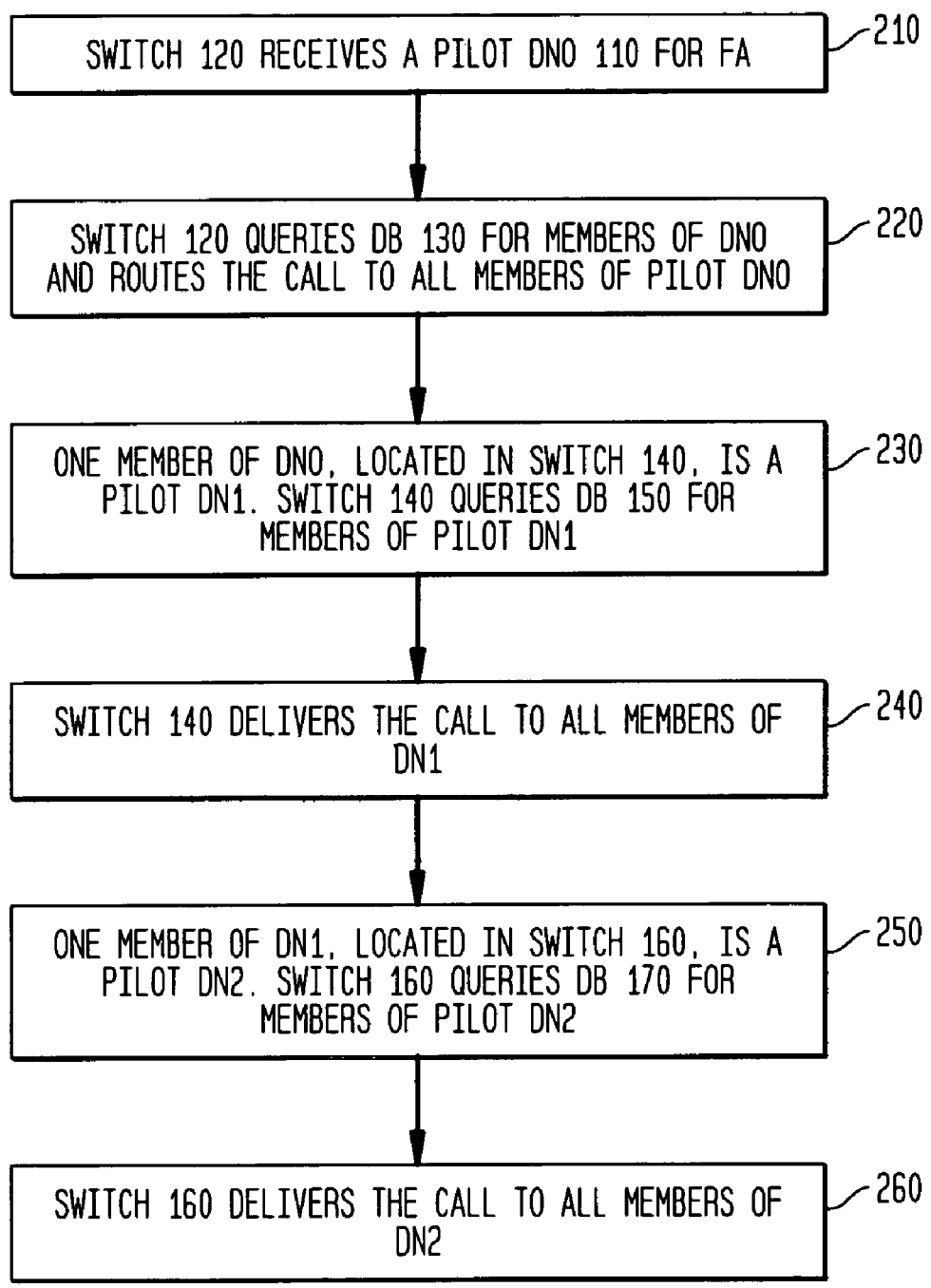

ENHANCED FLEXIBLE ALERTING

TECHNICAL FIELD

Figure 1:
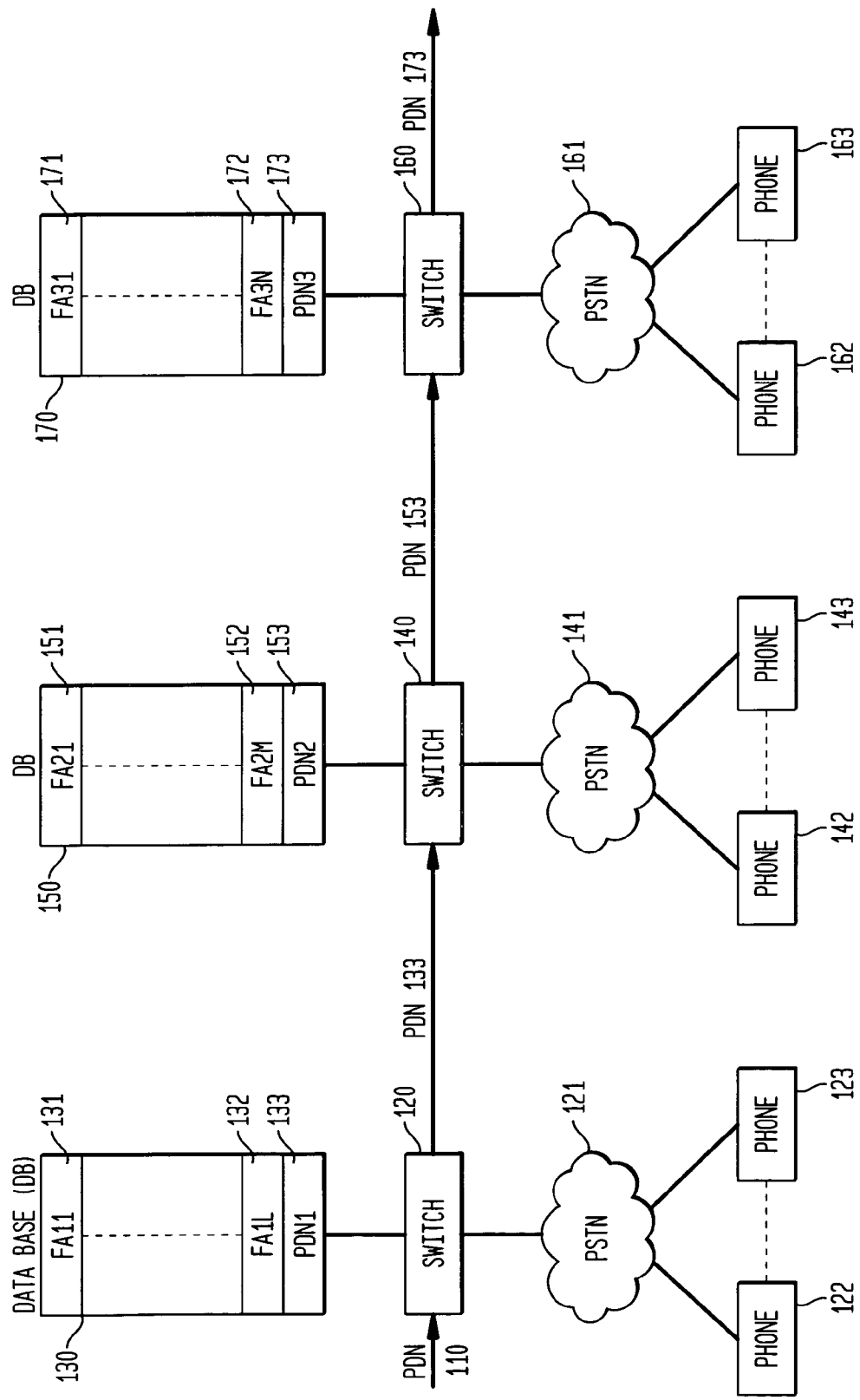

This invention relates to methods and apparatus for alerting groups of potential destinations for a telecommunications call.

BACKGROUND OF THE INVENTION

Flexible alerting is an available and popular telephone service. With flexible alerting, the members of a group of telephone stations are simultaneously alerted until one of these stations answers; thereafter, connections to the other stations are dropped. This arrangement is useful, for example, for a commuter who is anxious not to miss any calls and has flexible alerting for simultaneously alerting the commuter's office phone, cellular phone, and home phone. The commuter will answer whichever of these phones is available to him and connections to the other phones will be dropped.

SUMMARY OF THE INVENTION

Applicants have studied the characteristics of flexible alerting and believe that the present arrangement fails to meet certain needs. For example, if the destination is a business with representatives in different time zones, it may be inefficient to alert the representatives in all the time zones if the representatives in the nearby time zone are the ones who are most likely to be able to help the caller. Under those circumstances, it would be desirable to alert first one group of destination telephones and then subsequently alert a second group.

Applicants have enhanced the capabilities of flexible alerting in accordance with their invention wherein flexible alerting is first applied to a first group of telephones and after an appropriate interval if none of the first telephones have answered, alerting a second and, possibly, subsequently a third group of telephones.

In accordance with one preferred embodiment of the invention, the switch that is the source of the flexible alerting command and connection is different for the second and third groups thereby avoiding a plurality of long connections to the telephones of the second and third groups. In accordance with Applicants' preferred embodiment, the second group is associated with a switch one of whose telephone numbers is in the flexible alerting database of the first switch; the second switch then has its own database containing the telephone numbers of the second flexible alerting group.

Advantageously, preference is given to members of the first group and then subsequently to members of the second group and only a single long distance connection is required to reach the second switch for the flexible alerting of the second group.

BRIEF DESCRIPTION OF THE DRAWING(S)

FIG. 1 is a block diagram illustrating the operation of Applicants' invention; and FIG. 2 is a flow diagram illustrating the operation of Applicants' invention.

DETAILED DESCRIPTION

FIG. 1 is a block diagram illustrating the operation of Applicants' invention. A customer dials a number shown in FIG. 1 as pilot directory number PDN 110, different from the telephone numbers of any of the telephones of a first flexible alerting group. The switch 120 recognizes this dialed number as a pilot number for the enhanced flexible alerting service. Switch 120 has access to database (130) which contains a table of the first group of flexible alerting telephone numbers. The table contains flexible alerting numbers FA11 (131), . . . , FA1L (132). These are the telephone numbers of telephones 122, . . . , 123 accessible from switch 120 via public switched telephone network (PSTN) 121. In this example, PSTN 121 is a relatively localized network. There is no requirement that PSTN 121 be exclusively a localized network and it can advantageously include access to at least one relatively distant telephone. However, for the purpose of illustrating the efficiency of Applicants' invention, it is assumed that in most cases PSTN 121 has access primarily to telephones reasonably close to switch 120. In addition, database 130 includes one or more additional pilot directory numbers for accessing switches such as switch 140 as a flexible alerting number. If switch 140 is accessed via pilot directory number 133 (PDN 133), then switch 140 treats this access as a request to establish a flexible alerting connection. Switch 140 has a database associated with PDN 133 which includes telephone numbers FA21 (151), . . . , FA2M (152) the telephone numbers of telephone 142, . . . , 143. The latter set of telephones is accessed from switch 140 via PSTN 141 which as in the case of PSTN 121 is assumed to be for the purpose of setting up primarily short distance connections. Similarly, if no answers are received to the alerting signals sent out on the flexible alerting basis from switch 140, then the database of switch 140 also contains an additional pilot directory number PDN 153 for accessing switch 160 in order to continue the flexible alerting process. Switch 160 has in its database the telephone numbers FA31 (171), . . . , FA3N (172) of telephones 162, . . . , 163 accessed via PSTN 161.

Alerting of the telephones from switch 120 can continue while alerting of telephones from switch 140 takes place, or the alerting from switch 120 can be stopped once switch 140 starts alerting the second group of telephones.

FIG. 2 is a flow diagram illustrating the operation of Applicants' invention. Switch 120 receives a pilot directory number 110 (PDN 110) for flexible alerting (action block 210). Switch 120 queries database 130 for members of the flexible alerting group associated with PDN 110 and routes the call to all members of that flexible alerting group (action block 220). If one of the members of that flexible alerting group answers the call, then the other alerting connections are dropped and the call is completed to the answering telephone. If none of the members of the flexible alerting group of PDN 110 answer within a pre-specified time, then database 130 also contains a second pilot directory number PDN 133 in location 133 and switch 120 establishes a connection to switch 140 using PDN 133 (action block 230). Switch 140 alerts all members of the group associated with PDN 133, i.e., the group FA21, . . . , FA2M (action block 240). If one of these telephones answers, the call is completed to that telephone. If none of them answer, then the call is further passed on to switch 160 using PDN 153 found in location 153 of database 150 (action block 250) and switch 160 then routes the call to all the members of the group FA31, . . . , FA3N (action block 260). The process can be continued if the database 170 contains still another PDN such as PDN 173 (location 173).

In order to keep callers holding while successive attempts are made to alert different potential destinations, an announcement may be made following each successive stage of the alerting. The announcement might say something along the lines of: "We are trying to complete this call to another destination, please hold on". In addition, as with other call features, after a predetermined maximum number of rings, possibly prescribed by the destination customer, the call can be dropped if there is no answer.

The above description is of one preferred embodiment of Applicants' invention. Other embodiments will be apparent to those of ordinary skill in the art without departing from the scope of the invention. The invention is limited only by the attached claims.

We claim:

1. A method of alerting a plurality of groups of telephone stations comprising the steps of:
    alerting, in parallel, a first group of telephone stations accessed via a first switch each member of said first group having a different telephone number;
    if none of the first group of telephone stations answers, then establishing a connection to a second switch for accessing a second group of telephone stations each member of said second group having a different telephone number; and
    alerting, in parallel, the members of the second group accessed via the connection between the first and second switch;
    wherein a caller calls a pilot directory number, different from the number of any of said first group of telephone stations, for accessing members of the first group of telephone stations; and
    wherein the step of establishing a connection to said second switch comprises the step of said first switch calls a second pilot directory number for accessing the second group of telephone stations.

2. The method of claim 1 wherein the members of the first group of telephone stations are in a first database accessed by the first switch and the members of the second group of telephone stations are in a second database accessed by the second switch.

3. The method of claim 1 wherein members of the first group of telephone stations continue to be alerted when alerting signals are sent to the members of the second group.

4. The method of claim 1 wherein members of the first group no longer receive alerting signals when the second group is being alerted.

5. The method of claim 1 further comprising the steps of:
    establishing a connection to the first alerted telephone station that answers the call; and
    disconnecting alerting signals from other members of the first or second group which had been alerted prior to the answer by the first answering telephone station.

6. The method of claim 1 wherein the step of alerting a first group of telephone stations accessed via a first switch comprises the step of:
    accessing one of said first group of telephone stations via a third switch accessed over a trunk from said first switch.

7. Apparatus for alerting a plurality of groups of telephone stations comprising the steps of:
    in a first switch, means for alerting, in parallel, a first group of telephone station each member of said first group having a different telephone number accessed via said first switch;
    if none of the first group of telephone stations answers, means for establishing a connection to a second switch for alerting, in parallel, the members of a second group of telephone stations each member of said second group having a different telephone number accessed via the connection between the first and second switch;
    wherein said first switch is responsive to a caller calling a pilot directory number, different from the number of any of said first group of telephone stations, for accessing members of the first group of telephone stations; and
    wherein the first switch calls a second pilot directory number for accessing the second group of telephone stations.

8. The apparatus of claim 7 wherein the members of the first group of telephone stations are in a first database accessed by the first switch and the members of the second group of telephone stations are in a second database accessed by the second switch.

9. The apparatus of claim 7 wherein members of the first group of telephone stations continue to be alerted when alerting signals are sent to the members of the second group.

10. The apparatus of claim 7 wherein members of the first group no longer receive alerting signals when the second group is being alerted.

11. The apparatus of claim 7 wherein said first switch further comprises means for:
    establishing a connection to the first alerted telephone station that answers the call; and
    disconnecting alerting signals from other members of the first group which had been alerted prior to the answer by the first answering telephone station.

12. The apparatus of claim 7 wherein the means for alerting a first group of telephone stations accessed via said first switch comprises means for accessing one of said first group of telephone stations via a third switch accessed over a trunk from said first switch.

* * * * *